United States Patent
Falk et al.

(10) Patent No.: US 7,622,157 B2
(45) Date of Patent: Nov. 24, 2009

(54) USE OF POLYSILAZANE FOR THE PRODUCTION OF HYDROPHOBICALLY AND OLEOPHOBICALLY MODIFIED SURFACES

(75) Inventors: Uwe Falk, Bruchkoebel (DE); Hendrik Ahrens, Frankfurt am Main (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 566 days.

(21) Appl. No.: 10/554,190

(22) PCT Filed: Apr. 8, 2004

(86) PCT No.: PCT/EP2004/003754

§ 371 (c)(1),
(2), (4) Date: Oct. 21, 2005

(87) PCT Pub. No.: WO2004/094531

PCT Pub. Date: Nov. 4, 2004

(65) Prior Publication Data

US 2006/0246221 A1  Nov. 2, 2006

(30) Foreign Application Priority Data

Apr. 22, 2003 (DE) ................. 103 18 234

(51) Int. Cl.
*B05D 1/36* (2006.01)
(52) U.S. Cl. .............. 427/407.1; 427/407.2; 427/407.3; 427/408; 427/409; 427/411; 427/412; 427/412.1; 427/412.2; 427/412.3; 427/412.4; 427/412.5
(58) Field of Classification Search .... 427/407.1–412.5
See application file for complete search history.

(56) References Cited

U.S. PATENT DOCUMENTS

| | | | |
|---|---|---|---|
| 4,929,704 A | 5/1990 | Schwark | |
| 5,032,649 A | 7/1991 | Schwark | |
| 5,344,907 A | 9/1994 | Schwark | |
| 5,464,918 A | 11/1995 | Schwark | |
| 5,702,767 A * | 12/1997 | Peterson et al. | 427/407.1 |
| 5,800,918 A | 9/1998 | Chartier | |
| 5,849,942 A | 12/1998 | Standke | |
| 5,863,509 A | 1/1999 | Standke | |
| 5,885,654 A | 3/1999 | Hagiwara | |
| 5,997,943 A | 12/1999 | Azzopardi | |
| 6,177,582 B1 | 1/2001 | Jenkner | |
| 6,228,936 B1 | 5/2001 | Standke | |
| 6,329,487 B1 | 12/2001 | Abel et al. | |
| 6,383,641 B1 * | 5/2002 | Kondou et al. | 428/412 |
| 6,383,642 B1 * | 5/2002 | Le Bellac et al. | 428/412 |
| 6,534,184 B2 | 3/2003 | Knasiak et al. | |
| 6,627,559 B2 | 9/2003 | Shindo | |
| 6,652,978 B2 | 11/2003 | Lukacs, III et al. | |
| 6,713,186 B1 | 3/2004 | Jenkner | |
| 6,756,469 B2 | 6/2004 | Lukacs, III | |
| 2002/0034885 A1 | 3/2002 | Shindo | |
| 2003/0164113 A1 | 9/2003 | Suzuki | |
| 2005/0279255 A1 | 12/2005 | Suzuki et al. | |
| 2007/0116968 A1 | 5/2007 | Dierdorf et al. | |
| 2007/0190308 A1 | 8/2007 | Brand et al. | |
| 2007/0196672 A1 | 8/2007 | Brand et al. | |
| 2008/0107894 A1 | 5/2008 | Brand et al. | |

FOREIGN PATENT DOCUMENTS

| | | |
|---|---|---|
| CA | 2415288 | 11/2002 |
| DE | 10320180 | 6/2004 |
| EP | 0825231 | 2/1998 |
| EP | 1398359 | 3/2004 |
| WO | WO 2004/039904 | 5/2004 |
| WO | WO 2004039904 | 5/2004 |

OTHER PUBLICATIONS

English Translation of International Preliminary Report, PCT 2004/003754, Dated Oct. 28, 2005.
International Preliminary Report, PCT 2004/003754, Dated Oct. 28, 2005.

* cited by examiner

*Primary Examiner*—Erma Cameron
(74) *Attorney, Agent, or Firm*—Tod A. Waldrop; Richard P. Silverman

(57) ABSTRACT

The invention relates to the use of a polysilazane solution which comprises a polysilazane of the formula 1

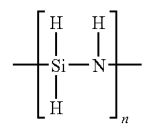

(1)

where n has been adjusted so that the polysilazane has a number-average molar mass of from 150 to 150 000 g/mol, and also comprises a solvent and a catalyst, as a primer for the coating of a surface with fluorosilanes or with fluorine-containing condensates.

8 Claims, No Drawings

USE OF POLYSILAZANE FOR THE PRODUCTION OF HYDROPHOBICALLY AND OLEOPHOBICALLY MODIFIED SURFACES

The present invention relates to a process for producing surfaces with hydrophobic and oleophobic properties using polysilazane as a primer coating for subsequent application of fluorine-containing components.

On surfaces with hydrophobic and oleophobic properties, oil-soluble and water-soluble contamination has poor adhesion and can readily be removed by water and mild cleaning compositions. Furthermore, on surfaces with hydrophobic and oleophobic properties water forms droplets with large contact angles, which run off without leaving any lime spots. Very recently, these easy-clean coating systems have also been utilized commercially.

Easy-clean coatings are usually not self-cleaning, but reduce the adhesion of dirt and make the surface easier to clean. They contribute to conservation of the environment, because there is no need to use aggressive cleaning compositions, and instead of these it is possible to use mild and neutral cleaning compositions. Measurement of the contact angle has become generally accepted as a measure of easy-clean properties. The higher the contact angle of a water droplet with respect to the surface, the greater is the run-off effect for water droplets, and the smaller the extent of formation of lime spots.

U.S. Pat. No. 5,997,943 describes the use of fluorosilanes (fluorine-containing alkoxysilanes) on glass in mixtures with organic solvents, acids, and water. The fluorosilanes described are mixed with other organosilanes and dissolved in suitable solvents. Addition of acids, such as acetic acid or sulfuric acid, activates the hydrolysis of the silanes. Once this solution is applied to the silicatic surface, the silanes react with the surface and become covalently bonded. This coating increases the contact angle of the water droplets on the glass surface from usually 50-60° to 100-110°. By way of example, typical fluorosilanes are $C_6F_{13}$-alkylethyltriethoxysilane, $C_8F_{17}$-alkylethyltriethoxysilane, $C_{10}F_{21}$-alkylethyltriethoxysilane and $C_{12}F_{25}$-alkylethyltriethoxysilane, and the corresponding methoxy, propoxy, butoxy, and methoxyethoxy, methoxydiethoxy and methoxytriethoxy compounds.

The perfluoroalkyl groups increase the contact angle of water and of hydrocarbons on the coated surface, and reduce the adhesion of organic and inorganic contamination, for example of fats, lime, and lime soaps. Fluorosilanes are suitable easy-clean coating compositions on silicatic surfaces.

EP-A-0 846 715 describes the preparation of fluorine-containing condensates from perfluoroalkylethyltrialkoxysilanes, using organic acids as hydrolysis catalyst. In that laid-open specification, fluorine-containing condensates are prepared by partial condensation of perfluoroalkylethyltrialkoxysilanes. For this, the fluorosilanes described above and other organosilanes are hydrolyzed using a substoichiometric amount of water, through acidification with acetic acid, sulfuric acid, or hydrochloric acid, thus giving fluorine-containing condensates colloidally dispersed in a solvent, such as ethanol or isopropanol. Fluorine-containing condensates can likewise be used for the coating of silicatic surfaces. Once the solvent (ethanol, isopropanol) has vaporized, the fluorine-containing condensates react with the surface and form covalent bonds. The fluorine-containing condensates are suitable for easy-clean coatings, and exhibit higher storage stability than solutions of fluorosilanes, and the coating also has higher resistance to scrubbing and washing.

EP-A-0 846 716 describes the combination of fluorosilanes with other organosilanes for preparing organopolysiloxanes in solvent mixtures composed of water and alcohols.

If silicatic surfaces, such as glass and ceramics, or surfaces composed of metal oxides, are coated with fluorosilanes or with fluorine-containing condensates, these react with the oxides of the surface and become covalently bonded. The chemical bonding between the substrate and the fluorosilane or fluorine-containing condensate durably secures the hydrophobic and oleophobic fluorine-containing substituents on the surface, and their effects are retained.

A disadvantage is that fluorosilanes or fluorine-containing condensates do not react with surfaces which do not have oxide groups or hydroxide groups. For example, metals, plastics, paints, and resins cannot be provided with a permanent hydrophobic and oleophobic effect with the aid of fluorosilanes or of fluorine-containing condensates.

Another disadvantage is the relatively small particle size of the fluorosilanes or fluorine-containing condensates. On highly absorbent surfaces or surfaces with large pores, the fluorosilanes or fluorine-containing condensates diffuse into the substrate and do not provide a sufficient easy-clean covering on the surface.

It is an object of the present invention to develop a process which permits permanent hydrophobic and oleophobic properties to be provided on metals, plastics, paints, resins, and porous surfaces.

Surprisingly, it has now been found that porous surfaces can be provided with permanent hydrophobic and oleophobic properties by pretreatment with polysilazane solutions.

The invention provides the use of a polysilazane solution which comprises a polysilazane of the formula 1

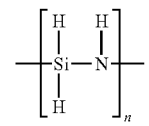

where n has been adjusted so that the polysilazane has a number-average molar mass of from 150 to 150 000 g/mol, and also comprises a solvent and a catalyst, as a primer for the coating of a surface with fluorosilanes or with fluorine-containing condensates.

The invention further provides a process for producing a surface coated with fluorosilanes or with fluorine-containing condensates, by, in a first step, bringing the uncoated surface into contact with a composition which comprises a polysilazane of the formula 1 and comprises a solvent and a catalyst, and then, in a second step, bringing the surface obtained in the first step in contact with fluorosilanes or with fluorine-containing condensates. It is preferable for the solvent to be permitted to vaporize after the first step.

The invention further provides a coated surface obtainable by the process described above.

The molar mass of the polysilazane is preferably from 300 to 10 000 g/mol, in particular from 600 to 3 000 g/mol.

The polysilazane solution preferably comprises, based on the weight of the solution, from 0.001 to 35% by weight, in particular from 0.5 to 5% by weight, and specifically from 1 to 3% by weight, of the polysilazane, from 0.00004 to 3.5% by weight, in particular from 0.02 to 0.5% by weight, and specifically from 0.04 to 0.3% by weight, of the catalyst, and solvent to 100% by weight.

Catalysts permit the conversion of polysilazane into silicon dioxide at low temperatures, in particular at room temperature. The amounts preferably used of the catalyst are from 0.1 to 10%, based on the weight of the polysilazane.

Suitable catalysts are N-heterocyclic compounds, such as 1-methylpiperazine, 1-methylpiperidine, 4,4'-trimethylenedipiperidine, 4,4'-trimethylenebis(1-methylpiperidine), diazobicyclo[2.2.2]octane, cis-2,6-dimethylpiperazine.

Other suitable catalysts are mono-, di-, and trialkylamines, such as methylamine, dimethylamine, trimethylamine, phenylamine, diphenylamine and triphenylamine, DBU (1,8-diazabicyclo[5.4.0]-7-undecene), DBN (1,5-diazabicyclo[4.3.0]-5-nonene), 1,5,9-triazacyclododecane and 1,4,7-triazacyclononane.

Other suitable catalysts are organic or inorganic acids, such as acetic acid, propionic acid, butyric acid, valeric acid, maleic acid, stearic acid, hydrochloric acid, nitric acid, sulfuric acid, phosphoric acid, chloric acid, and hypochlorous acid.

Other suitable catalysts are metal carboxylates of the formula $(RCOO)_nM$ of saturated or unsaturated, aliphatic or alicyclic $C_1$-$C_{22}$ carboxylic acids, and metal ions, such as Ni, Ti, Pt, Rh, Co, Fe, Ru, Os, Pd, Ir, and Al; n is the charge on the metal ion.

Other suitable catalysts are acetylacetonate complexes of metal ions, such as Ni, Pt, Pd, Al, and Rh.

Other suitable catalysts are metal powders, such as Au, Ag, Pd, or Ni with a particle size of from 20 to 500 nm.

Other suitable catalysts are peroxides, such as hydrogen peroxide, metal chlorides, and organometallic compounds, such as ferrocenes, and zirconocenes.

The solvent permits the preparation of solutions of the polysilazane and of the catalyst with sufficiently long storage time without formation of silanes, hydrogen, or ammonia. Suitable solvents are aromatic, cyclic, and aliphatic hydrocarbons, halogenated hydrocarbons, and ethers.

By way of example, suitable solvents are aliphatic, aromatic, and cyclic hydrocarbons, and dibutyl ether.

The polysilazane solution described may be used to coat a wide selection of substrate surfaces. Suitable substrates are
- metals, e.g. iron, stainless steel, zinc, aluminum, nickel, copper, magnesium, and their alloys, silver, and gold,
- plastics, e.g. polymethyl methacrylate, polyurethane, polycarbonate, polyesters, such as polyethylene terephthalate, polyimides, polyamides, epoxy resins, ABS, polyethylene, polypropylene, polyoxymethylene,
- porous mineral materials, such as concrete, fired clay, marble, basalt, asphalt, loam, terracotta,
- paint surfaces, e.g. polymer-based emulsion paints, acrylic paints, epoxy paints, melamine resins, polyurethane resins, and alkyd paints, and
- organic materials, such as wood, leather, parchment, paper, and textiles.

To accelerate the process, in one preferred embodiment the polysilazane solution may be applied with an aqueous surfactant solution. Preferred surfactants are alkanesulfonates, betaines, alkyl ethoxylates, and ether sulfates. The surfactant solution preferably comprises from 0.1 to 5% of surfactants, and is applied to the polysilazane-coated surface either by immersion or by wiping or spraying.

The reaction of perfluoroalkyl-containing compounds with the surface obtained in the second step of the process provides hydrophobic and oleophobic properties, and easy-clean properties. The contact angle of distilled water then achieves values >90°, in particular >110°. By way of example, perfluoroalkyl-containing compounds are $C_6F_{13}$-alkylethyltriethoxysilane, $C_8F_{17}$-alkylethyltriethoxysilane, $C_{10}F_{21}$-alkylethyltriettloxysilane, and $C_{12}F_{25}$-alkylethyltriethoxysilane, and the corresponding methoxy, propoxy, butoxy, and methoxyethoxy, methoxydiethoxy, and methoxytriethoxy compounds, and fluorine-containing condensates.

The result is that permanent easy-clean properties are readily available, even on substrates which hitherto could not be provided with these properties in this way. It is also advantageously possible to seal highly absorbent and porous substrates with the aid of the polysilazane coating.

Suitable solvents are mono- and polyalkylene glycol dialkyl ethers (glymes), or mixtures composed of mono- and polyalkylene glycol dialkyl ethers with aliphatic, cyclic, or aromatic hydrocarbons.

For the purposes of this invention, vapor pressure osmometry is used to determine the molar mass of the polysilazane.

EXAMPLES

Examples of the composition of suitable polysilazane solutions are given below (data in % by weight):

Solution 1
20% of polysilazane with an average molar mass of 2 000 g/mol
0.8% of 4,4'-trimethylenebis(1-methylpiperidine)
79.2% of xylene Solution 2
5% of polysilazane with an average molar mass of 2 000 g/mol
0.2% of 4,4'-trimethylenebis(1-methylpiperidine)
19.8% of xylene
75% of hydrocarbon mixture comprising aromatics (®Pagasol AN 45 from ExxonMobil)

Solution 3
1% of polysilazane with an average molar mass of 2 000 g/mol
0.04% of 4,4'-trimethylenebis(1-methylpiperidine)
3.96% of xylene
95% of hydrocarbon mixture comprising aromatics (®Pagasol AN 45 from ExxonMobil)

Solution 4
5% of polysilazane with an average molar mass of 2 000 g/mol
0.2% of 4,4'-trimethylenebis(1-methylpiperidine)
19.2% of xylene
75% of hydrocarbon mixture comprising aromatics (®Varsol 40 from ExxonMobil)

Solution 5
1% of polysilazane with an average molar mass of 2 000 g/mol
0.04% of 4,4'-trimethylenebis(1-methylpiperidine)
3.96% of xylene
95% of hydrocarbon mixture comprising aromatics (®Varsol 40 from ExxonMobil)

Solution 6
5% of polysilazane with an average molar mass of 2 000 g/mol
0.2% of 4,4'-trimethylenebis(1-methylpiperidine)
19.8% of xylene
75% of dipropylene glycol dimethyl ether Solution 7
1% of polysilazane with an average molar mass of 2 000 g/mol
0.04% of 4,4'-trimethylenebis(1-methylpiperidine)

3.96% of xylene
95% of dipropylene glycol dimethyl ether

Solution 8
5% of polysilazane with an average molar mass of 2 000 g/mol
0.2% of 4,4'-trimethylenebis(1-methylpiperidine)
19.8% of xylene
20% of dipropylene glycol dimethyl ether
55% of hydrocarbon mixture low in aromatics (Exxsol D 40 from ExxonMobil)

Solution 9
1% of polysilazane with an average molar mass of 2 000 g/mol
0.04% of 4,4'-trimethylenebis(1-methylpiperidine)
3.96% of xylene
20% of dipropylene glycol dimethyl ether
75% of hydrocarbon mixture low in aromatics (Exxsol D 40 from ExxonMobil)

Solution 10
0.2% of polysilazane with an average molar mass of 2 000 g/mol
0.008% of 4,4'-trimethylenebis(1-methylpiperidine)
0.792% of xylene
20% of dipropylene glycol dimethyl ether
79% of hydrocarbon mixture low in aromatics (Exxsol D 40 from ExxonMobil)

The following examples below are intended to provide further description of the use of a polysilazane solution for primer-coating and the subsequent application of fluorine-containing components.

Example 1

Easy-clean Coating of Steel Sheet

A non-rusting steel sheet was coated with a 1% strength polysilazane solution (solution 3), using a nonwoven viscose cloth to distribute about 8 ml/m² of the solution uniformly on the surface, until the solvent has vaporized. Application of the polysilazane solution was repeated once. The polysilazane-coated steel sheet was then coated with an aqueous solution of a fluorine-containing condensate (®Nano-E2C 200 from Nanogate, Saarbrücken). The amount applied was 8 ml/m², application being uniform by manual distribution, using a nonwoven viscose cloth. For condensation of the fluorine-containing condensate, the steel sheet is cured at 260° C. for 1 hour. The contact angle of distilled water was 74° prior to coating and 110° after coating.

In a second experiment, the polysilazane-coated steel sheet was treated with an aqueous surfactant solution. The wetting promoter used to prepare the aqueous surfactant solution had the following composition:

| | |
|---|---|
| ®Hostapur SAS 30 | 28% |
| ®Genagen CA 050 | 3.6% |
| ®Genapol UD 080 | 5% |
| Propylene glycol | 3% |
| Sodium benzoate | 0.3% |
| Citric acid | for adjustment to pH 6 |
| Demineralized water | remainder |

2 ml/l of the wetting promoter were dissolved in water to prepare the surfactant solution. The surfactant solution was applied to the polysilazane-coated steel sheet, then rinsed with demineralized water, and dried. The solution of the fluorine-containing condensate in isopropanol (®Nano-E2C 110 from Nanogate, Saarbrücken), was applied to the dry steel sheet, twice distributing 8 ml/m² uniformly on the surface, using a nonwoven viscose cloth, until the isopropanol had vaporized. The fluorine-containing condensate cured at room temperature and become permanently bonded to the steel sheet. The contact angle of distilled water after coating was 109°.

Example 2

Easy-clean Coating of Zinc Sheets

A zinc sheet was twice coated manually as described in example 1 with a 1% strength solution of polysilazane (solution 3). 8 ml/m² of the fluorine-containing condensate in isopropanol (®Nano-E2C 110 from Nanogate, Saarbrücken) were then applied twice and cured at room temperature. The hydrophobic and oleophobic coating could be bonded permanently to the zinc sheet. The contact angle of distilled water was 63° prior to coating with polysilazane and 108° after coating with the fluorine-containing condensate.

Example 3

Easy-clean Coating of Polycarbonate Sheets

Polycarbonate sheets of thickness 2 mm were coated twice with a 1% strength polysilazane solution (solution 3). For this, 8 m/m² were distributed, using a nonwoven viscose cloth, until the solvent evaporated. This was followed by coating twice with 8 ml/m² of the fluorine-containing condensate in isopropanol (®Nano-E2C 110 from Nanogate, Saarbrücken). This was likewise applied using a nonwoven viscose cloth until the isopropanol vaporized. Curing took place at room temperature. The contact angle of distilled water was 76° prior to coating with polysilazane and 115° after coating with the fluorine-containing condensate.

Example 4

Easy-clean Coating of Polyethylene Terephthalate

PET film was coated twice with a 1% strength polysilazane solution (solution 3). For this, 8 ml/m² were distributed, using a nonwoven viscose cloth, until the solvent vaporized. This was followed by coating twice with 8 ml/m² of the fluorine-containing condensate in isopropanol (®Nano-E2C 110 from Nanogate, Saarbrücken). This was likewise applied using a nonwoven viscose cloth until the isopropanol vaporized. Curing took place at room temperature. The contact angle of distilled water was 17° prior to coating with polysilazane and 115° after coating with the fluorine-containing condensate.

Example 5

Easy-clean Coating of Automotive Paints

An automotive paint was twice coated with a 1% strength polysilazane solution (solution 3). For this, on each occasion 8 ml/m² were distributed, using a nonwoven viscose cloth, until the solvent vaporized. This was followed by two applications of 8 ml/m² of the fluorine-containing condensate in isopropanol (®Nano-E2C 110 from Nanogate, Saarbrücken). A nonwoven viscose cloth was used for application until the isopropanol vaporized. After coating, the surface is markedly hydrophobic. Water droplets rapidly run off.

Example 6

Easy-clean Coating of Brass

A brass sheet was twice coated with a 1% strength polysilazane solution (solution 3). Consumption was 8 ml/m$^2$ per coating step. After 10 minutes, the polysilazane layer was treated with an aqueous surfactant solution from example 1 and converted to silicon dioxide. This was followed by two applications of 8 ml/m$^2$ of the fluorine-containing condensate in isopropanol (®Nano-E2C 110 from Nanogate, Saarbrücken). The contact angle of distilled water was 78° prior to polysilazane coating. After coating with the fluorine-containing condensate the contact angle was 115°.

In another variant, a fluorosilane solution in isopropanol and water was used to confer hydrophobic and oleophobic properties. For this, the following solution was provided:

| | |
|---|---|
| 2% | of C$_6$-perfluoroalkylethyltriethoxysilane |
| 88% | of isopropanol |
| 0.6% | of glacial acetic acid |
| 9.4% | of demineralized water |

The polysilazane-coated brass sheet was twice coated with 8 ml/m$^2$ of this fluorosilane solution. The solution was uniformly distributed manually, using a nonwoven viscose cloth, until the volatile constituents have vaporized. The contact angle of distilled water after fluorosilane coating was 124°.

Example 7

Easy-clean Coating of Copper Sheets

A copper sheet was coated as in example 6 with polysilazane, and treated with the aqueous surfactant solution from example 1 for conversion to silicon dioxide. This was followed by two applications of 8 ml/m$^2$ of the fluorine-containing condensate in isopropanol (®Nano-E2C 110 from Nanogate, Saarbrücken). The contact angle of distilled water was 82° prior to polysilazane coating. After coating with the fluorine-containing condensate the contact angle was 114°. As an alternative to the fluorine-containing condensate, use was made of the solution, described in example 6, of the C$_6$-perfluoroalkylethyltriethoxysilane in isopropanol/water for coating. After two applications of 8 ml/m$^2$ of the fluorosilane solution, the contact angle measured for distilled water was 125°.

Example 8

Easy-clean Coating of Stainless Steel Sheets

A stainless steel sheet was coated as in example 6 with polysilazane, and treated with the aqueous surfactant solution from example 1 for conversion to silicon dioxide. This was followed by two applications of 8 ml/m$^2$ of the fluorine-containing condensate in isopropanol (®Nano-E2C 110 from Nanogate, Saarbrücken). The contact angle of distilled water was 73° prior to polysilazane coating. After coating with the fluorine-containing condensate the contact angle was 108°. As an alternative to the fluorine-containing condensate, use was made of the solution, described in example 6, of the C$_6$-perfluoroalkylethyltriethoxysilane in isopropanol/water for hydrophobic and oleophobic coating. After two applications of 8 ml/m$^2$ of the fluorosilane solution, the contact angle measured for distilled water was 115°.

Example 9

Easy-clean Coating of Aluminum Sheets

An aluminum sheet was coated as in example 6 with polysilazane, and treated with the aqueous surfactant solution from example 1 for conversion to silicon dioxide. This was followed by two applications of 8 ml/m$^2$ of the fluorine-containing condensate in isopropanol (®Nano-E2C 110 from Nanogate, Saarbrücken). The contact angle of distilled water was 78° prior to polysilazane coating. After coating with the fluorine-containing condensate the contact angle was 112°. As an alternative to the fluorine-containing condensate, use was made of the solution, described in example 6, of the C$_6$-perfluoroalkylethyltriethoxysilane in isopropanol/water for hydrophobic and oleophobic coating. After two applications of 8 ml/m$^2$ of the fluorosilane solution, the contact angle measured for distilled water was 120°.

Example 10

Easy-clean Coating of Polypropylene, Melamine-resin-coated Particle Board, and Laminated Floorcovering A polypropylene sheet, a melamine-resin-coated particle board and a laminated floorcovering sheet were coated, as in example 6, with polysilazane. This was followed by two applications of 8 ml/m$^2$ of the fluorine-containing condensate in isopropanol (®Nano-E2C 110 from Nanogate, Saarbrücken). As an alternative to the fluorine-containing condensate, use was made of the fluorosilane solution described in example 6 for hydrophobic and oleophobic coating, 8 ml/m$^2$ being applied twice. The following contact angles were measured for distilled water.

Polypropylene
Prior to polysilazane coating: 100°
After coating with the fluorine-containing condensate: 112°
After coating with the fluorosilane solution: 128°

Melamine-resin-coated Particle Board
Prior to polysilazane coating: 77°
After coating with the fluorine-containing condensate: 127°
After coating with the fluorosilane solution: 122°

Laminated Floorcovering
Prior to polysilazane coating: 40°
After coating with the fluorine-containing condensate: 115°
After coating with the fluorosilane solution: 122°

Example 11

Easy-clean Coating of Polycarbonate Wheel Caps

As described in example 6, polycarbonate wheel caps were twice coated with 8 ml/m$^2$ of the polysilazane solution (solution 3) and then treated with the aqueous surfactant solution from example 1. The polycarbonate wheel cap was then twice coated with 8 ml/m$^2$ of the fluorine-containing condensate in isopropanol (®Nano-E2C 110 from Nanogate, Saarbrücken). As an alternative, 8 ml/m$^2$ of the fluorosilane solution from example 6 were twice used for coating. The curvature of the wheel cap prevented determination of the contact angle. However, this surface is markedly hydrophobic and water droplets readily ran off.

The invention claimed is:

1. A process for coating a surface with fluorosilanes or fluorosilane containing condensates, said process comprising
   a) in a first step disposing on said surface a polysilazane solution which comprises a polysilazane of the formula 1

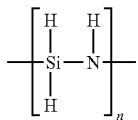

where n has been adjusted so that the polysilazane has a number-average molar mass of from 150 to 150 000 g/mol, and a solvent and a catalyst,
   b) in a second step disposing on said surface fluorosilanes or fluorosilane containing condensates to provide a coated surface.

2. The process of claim 1, in which the polysilazane solution comprises from 0.001 to 35% by weight of the polysilazane.

3. The process of claim 1, in which the catalyst comprises from 0.00004 to 3.5% by weight of the polysilazane solution.

4. The process of claim 1, wherein the catalyst is selected from the group consisting of N-heterocyclic compounds, mono-alkylamines, di-alkylamines, trialkylamines, organic acids, inorganic acids, metal carboxylates of the formula $(RCOO)_nM$ wherein RCOO is a $C_1$-$C_{22}$ saturated or $C_1$-$C_{22}$ unsaturated or $C_1$-$C_{22}$ aliphatic or $C_1$-$C_{22}$ alicyclic carboxylic acid and M is a metal ion with charge n, acetylacetonate complexes of metal ions, metal powders with a particle size of from 20 to 500 nm, peroxides, metal chlorides, and organometallic compounds.

5. The process of claim 1, in which the solvent is selected from the group consisting of aromatic hydrocarbons, cyclic hydrocarbons, aliphatic hydrocarbons, halogenated hydrocarbons, and ethers.

6. A process for producing a surface coated with fluorosilanes or with fluorosilane-containing condensates, by, in a first step, bringing the uncoated surface into contact with a composition which comprises a polysilazane of the formula 1,

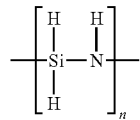

where n has been adjusted so that the polysilazane has a number-average molar mass of from 150 to 150 000 g/mol, a solvent and a catalyst, and then, in a second step, bringing the surface obtained in the first step in contact with a fluorosilane compound or fluorosilane-containing condensate, and curing the composition to provide said coated surface.

7. The process as claimed in claim 6, in which the fluorosilane compound or fluorosilane-containing condensate is a perfluoroalkyl-containing compound selected from the group consisting of a silane compound of $C_6F_{13}$-alkylethyltriethoxysilane, $C_8F_{17}$-alkylethyltriethoxysilane, $C_{10}F_{21}$-alkylethyltriethoxysilane, $C_{12}F_{25}$-alkylethyltriethoxysilane and the corresponding methoxy, propoxy, butoxy, methoxyethoxy, and methoxydiethoxy compounds of said silane compound.

8. A coated surface obtained by the process of claim 6.

* * * * *